April 11, 1950 G. VOLLET 2,503,365
APPARATUS FOR MAKING FLEXIBLE BANDS
Filed Aug. 17, 1945 10 Sheets-Sheet 4
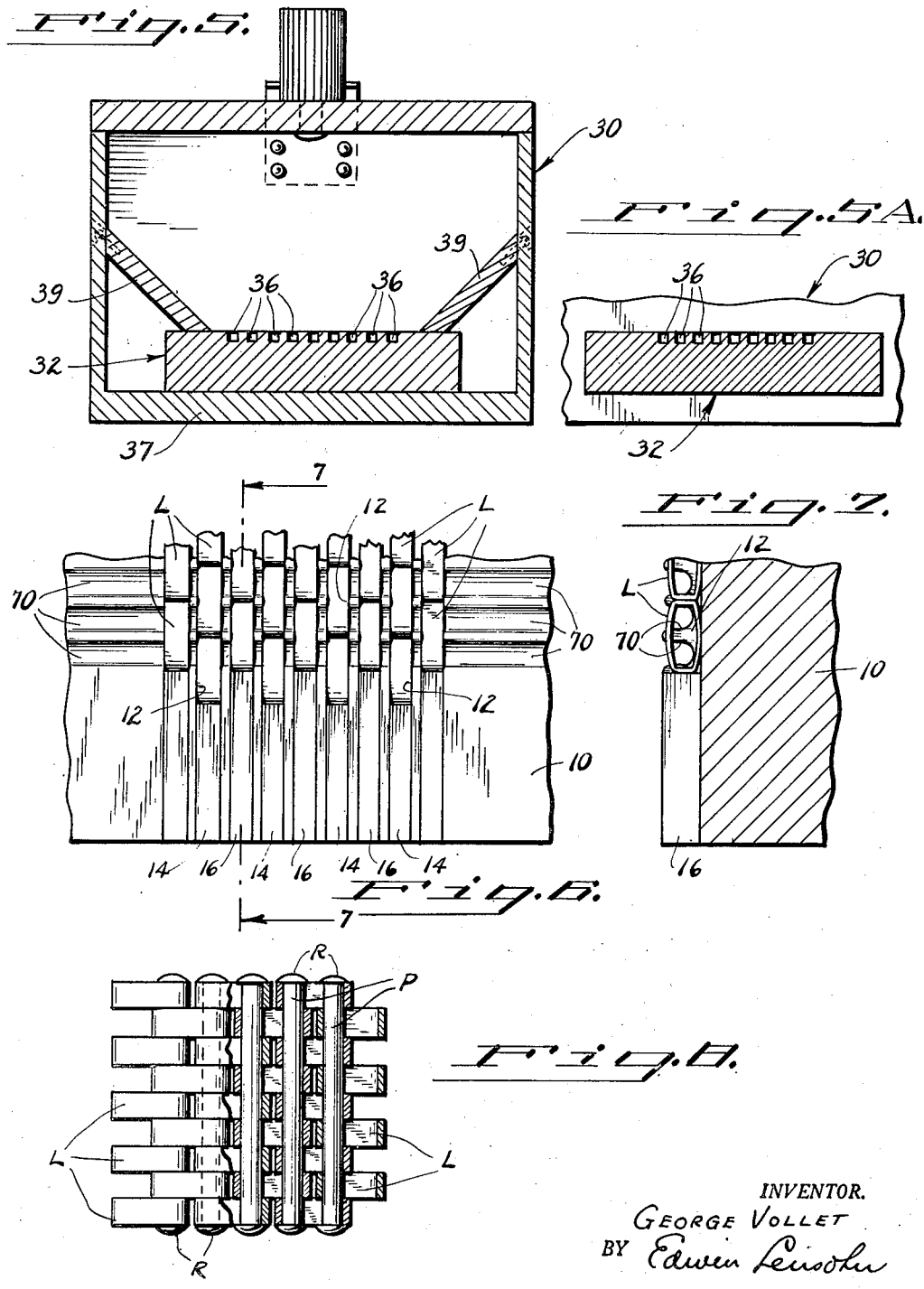

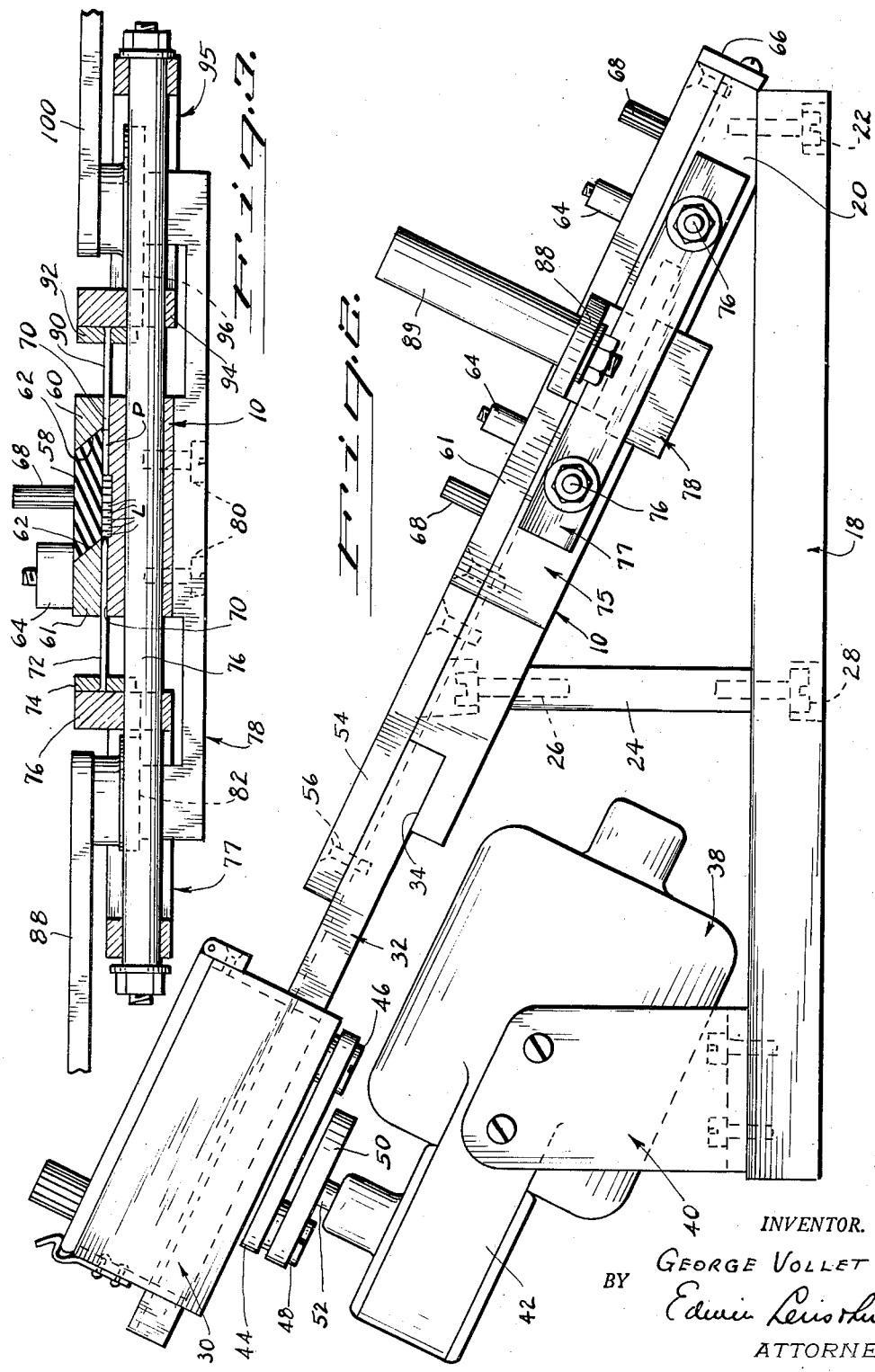

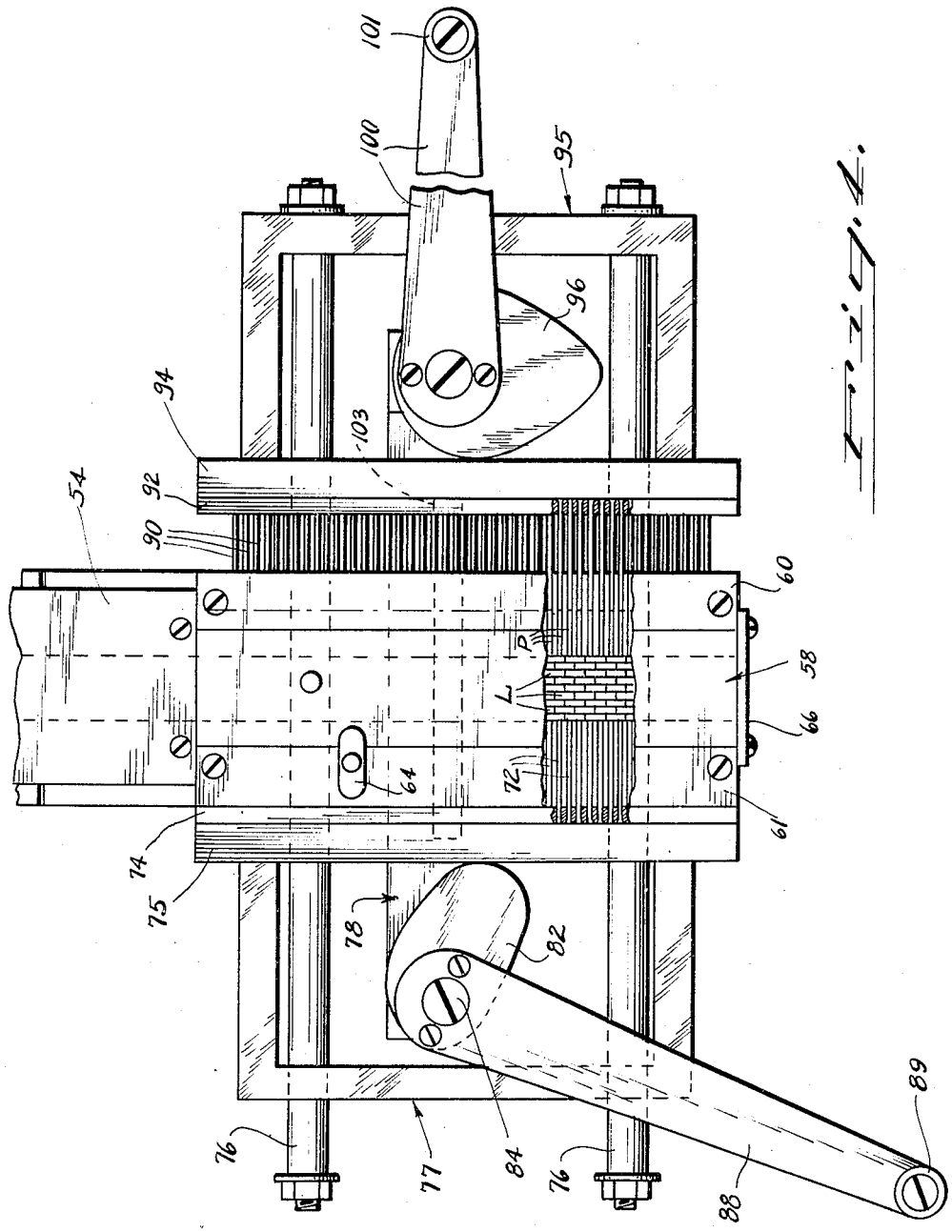

April 11, 1950          G. VOLLET          2,503,365
APPARATUS FOR MAKING FLEXIBLE BANDS Filed Aug. 17, 1945          10 Sheets-Sheet 5

INVENTOR.
GEORGE VOLLET
BY Edwin Leinohn
ATTORNEY.

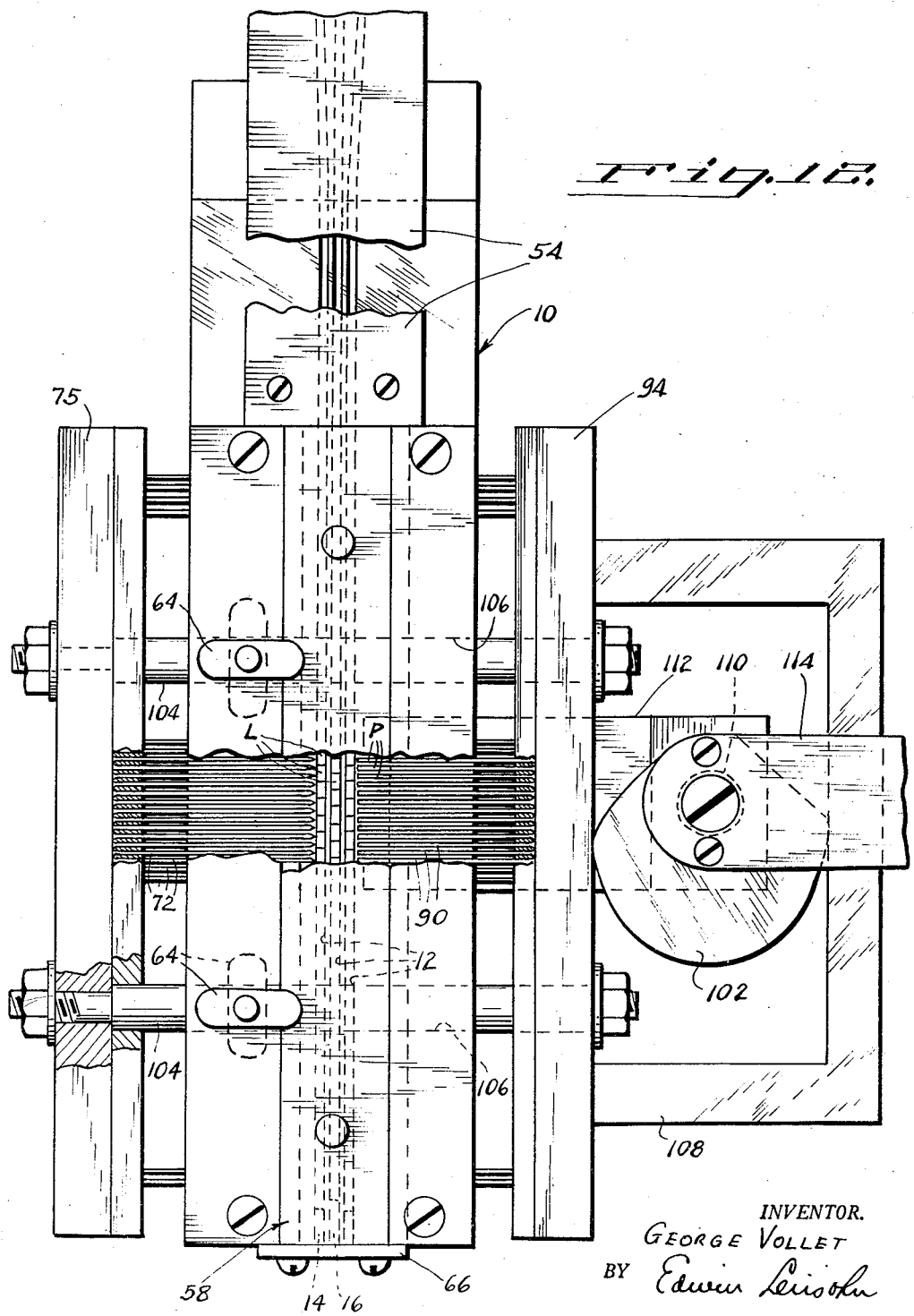

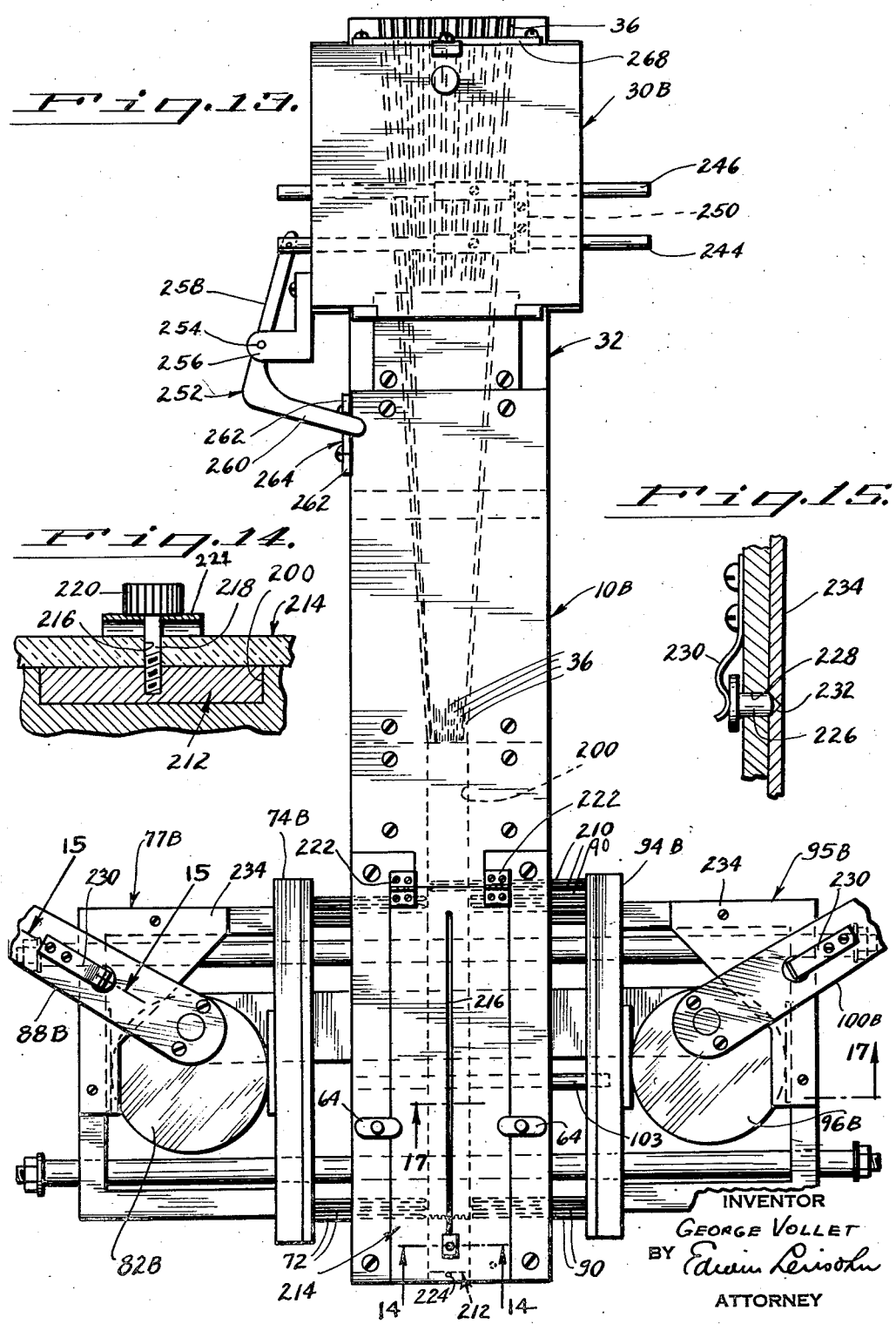

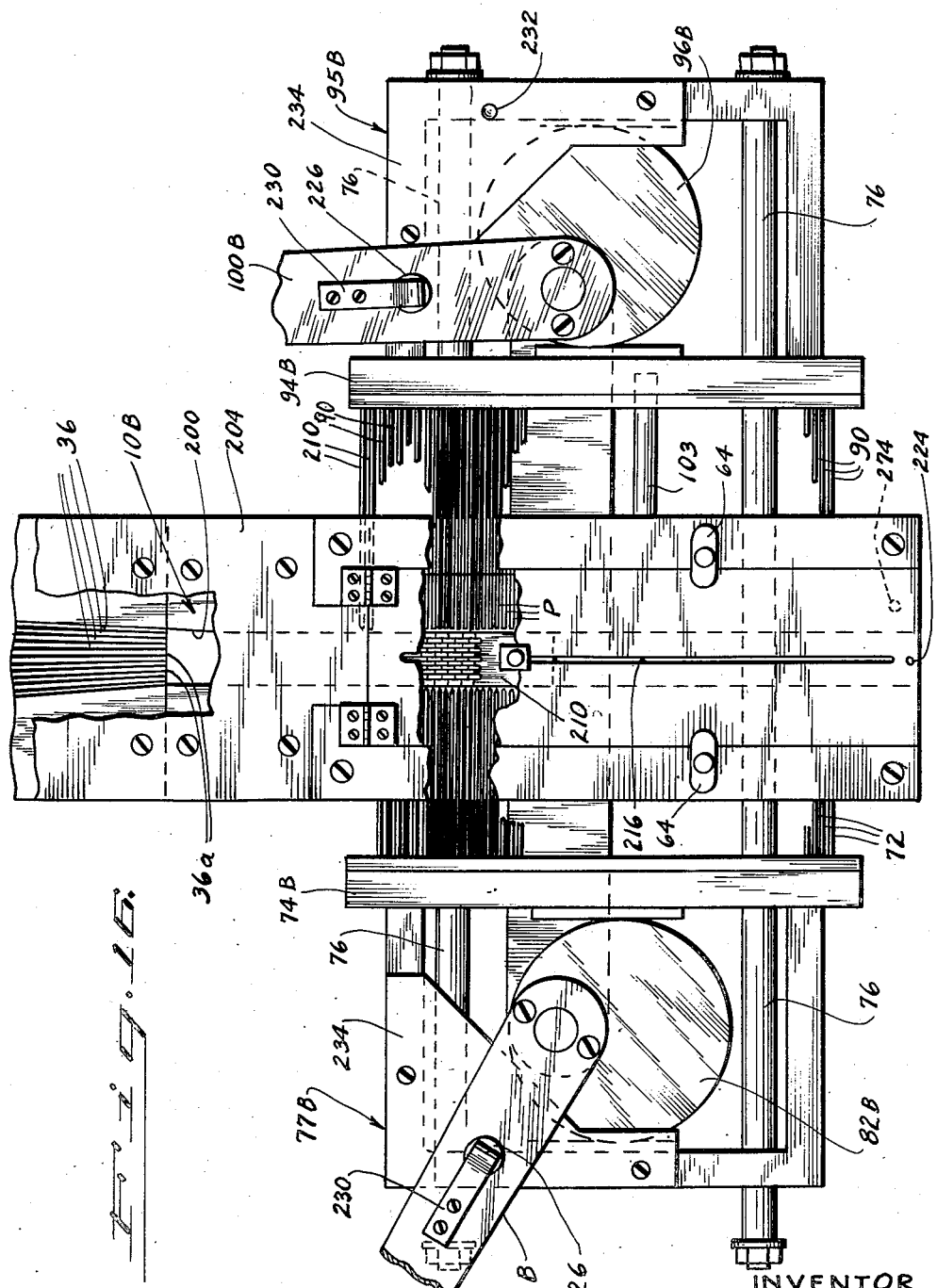

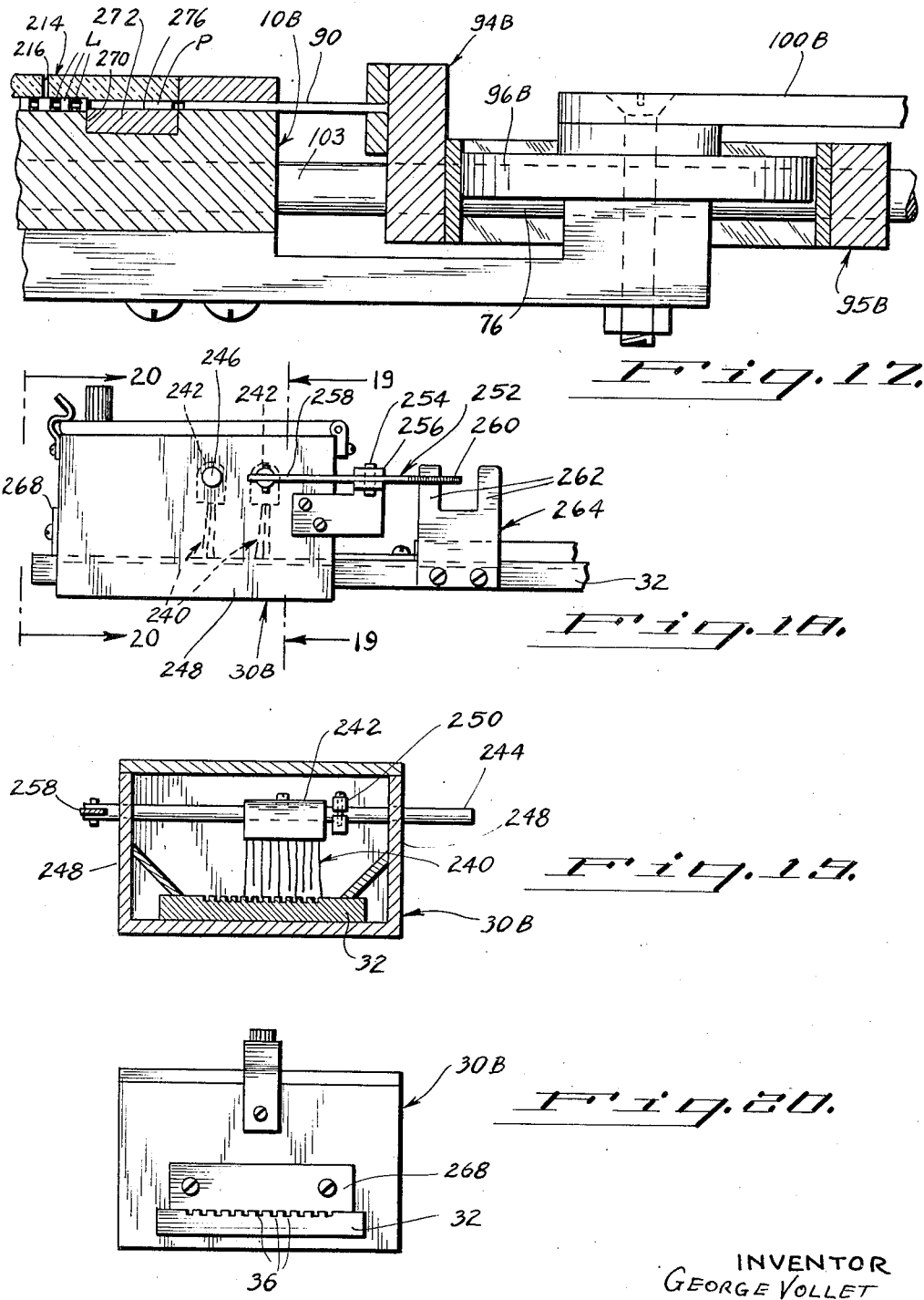

April 11, 1950 G. VOLLET 2,503,365
APPARATUS FOR MAKING FLEXIBLE BANDS
Filed Aug. 17, 1945 10 Sheets-Sheet 10
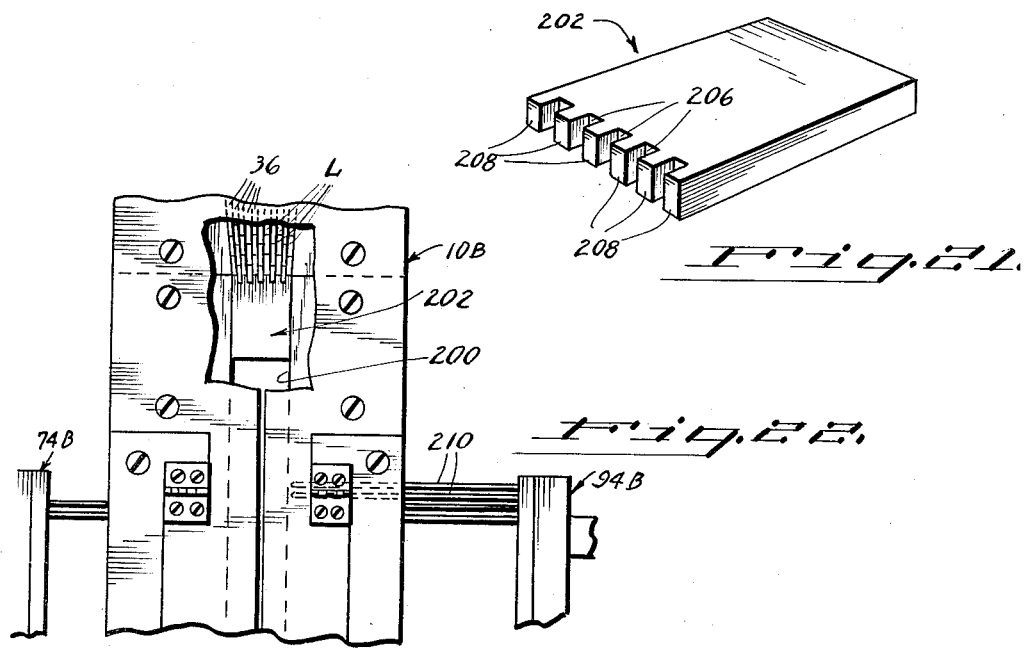
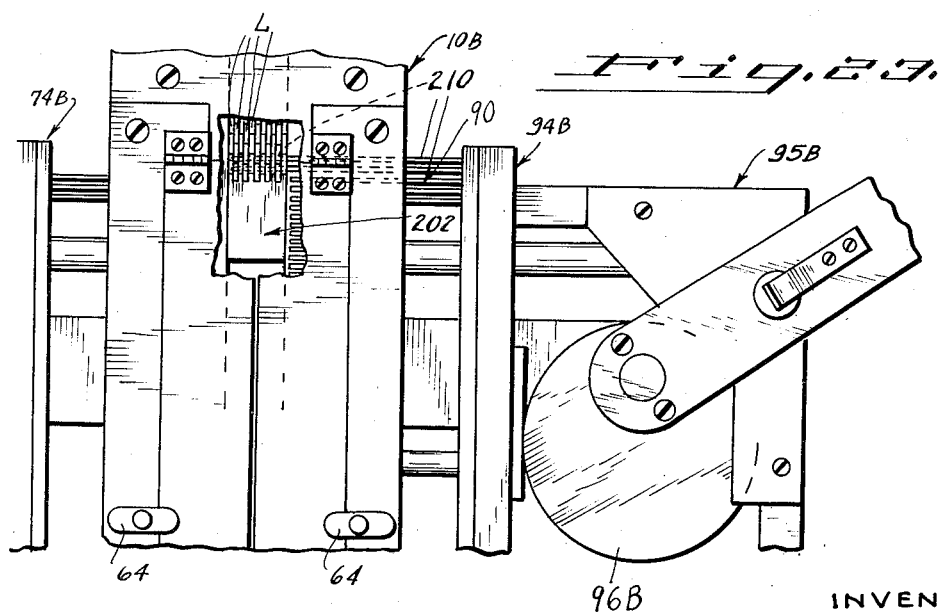
INVENTOR
GEORGE VOLLET
BY Edwin Leister
ATTORNEY Patented Apr. 11, 1950

2,503,365

UNITED STATES PATENT OFFICE 2,503,365

APPARATUS FOR MAKING FLEXIBLE BANDS

George Vollet, Freeport, N. Y., assignor to Jacques Kreisler Manufacturing Corporation, North Bergen, N. J., a corporation Application August 17, 1945, Serial No. 610,915

16 Claims. (Cl. 59—7)

This invention relates to the manufacture of flexible bands for bracelets or other articles of jewelry for personal wear.

More particularly the present invention relates to the manufacture of flexible bands of a well known type in which a plurality of links are arranged in end-to-end relation in a plurality of adjacent rows with the links in one row offset longitudinally of the links in an adjacent row, and with pivot pins for the links extending therethrough transversely through the band. Due to the small size and large number of links required to form the flexible band, the method as heretofore practiced for assembling the links and pivot pins in band forming relation is tedious, time consuming and expensive. The primary object of the present invention therefore is to provide a method of and means for facilitating the assembly of the links and pivot pins in band forming relation whereby to obviate the above mentioned and other disadvantages of the old method.

The above and other objects of the invention which might hereinafter appear, will be fully understood from the following description, reference being had to the accompanying illustrative drawings.

In the drawings:

Fig. 2 is a side view thereof;

Fig. 3 is a sectional view on the line 3—3 of Fig. 1;

Fig. 4 is a front view of part of the apparatus, with parts broken away for the purpose of illustration;

Fig. 5 is a sectional view on the line 5—5 of Fig. 1;

Fig. 5A is a sectional view on the line 5A—5A of Fig. 1;

Fig. 6 is a view, on a larger scale, of a part of the apparatus;

Fig. 7 is a sectional view on the line 7—7 of Fig. 6;

Fig. 8 is an enlarged plan view, with parts in section, of a band of the type to which the method and apparatus of the present invention relates;

Fig. 12 is a view similar to Fig. 4 showing a modification in the apparatus of the present invention.

Fig. 13 is a view similar to Fig. 1 illustrating another form of the apparatus and method of the present invention;

Figure 1:
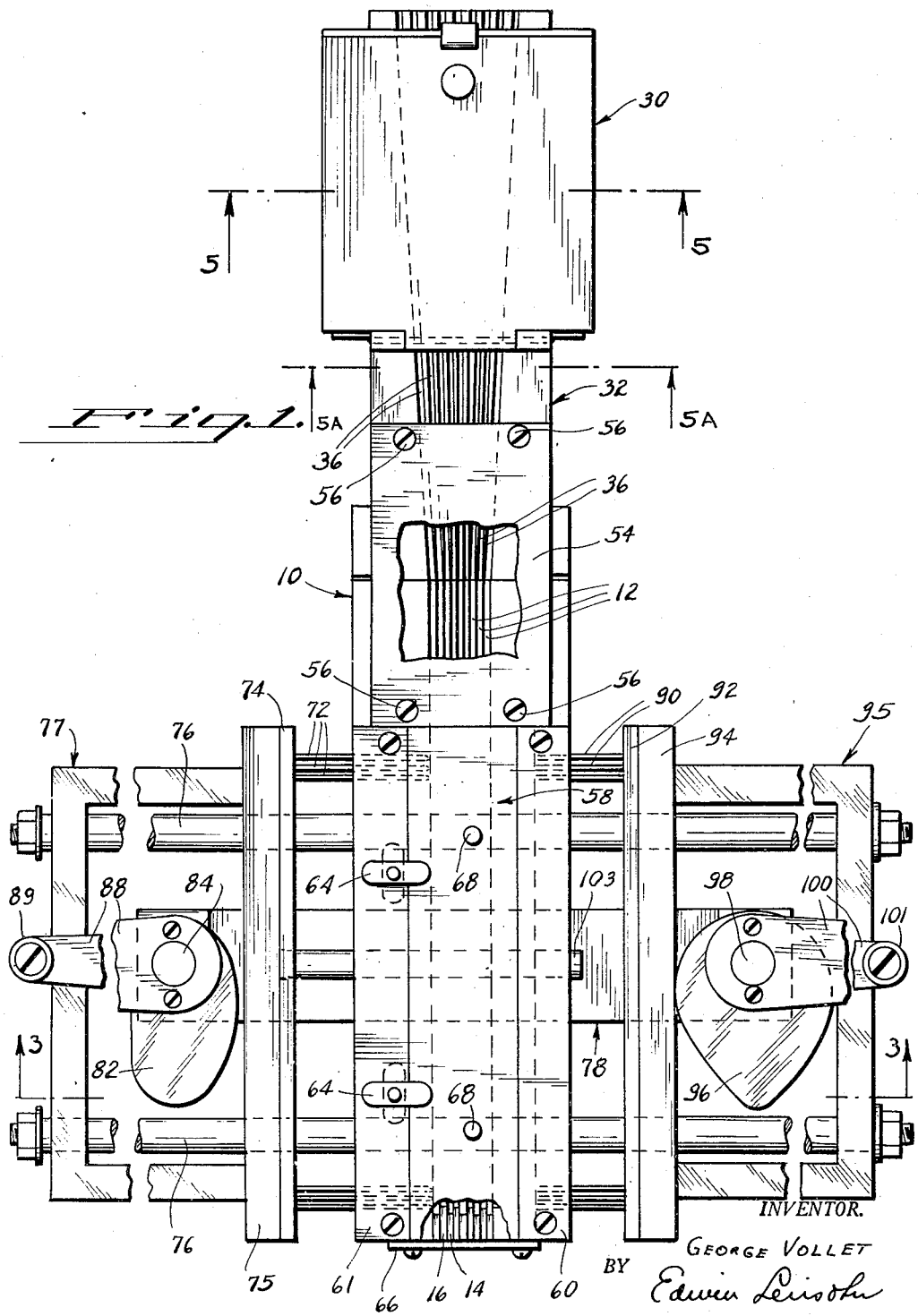
Fig. 1 is a front view of apparatus embodying the present invention.

Figs. 14 and 15 are detail sectional views on the lines 14—14 and 15—15, respectively, of Fig. 13;

Fig. 16 is a front view of part of the apparatus illustrated in Fig. 13, with parts broken away for the purpose of illustration;

Fig. 17 is a sectional view on the line 17—17 of Fig. 13;

Fig. 18 is a side view of the hopper and parts associated therewith;

Fig. 19 is a sectional view on the line 19—19 of Fig. 18;

Fig. 20 is a rear elevational view of the hopper and parts associated therewith;

Fig. 21 is a perspective view of an auxiliary member utilized in the method and apparatus illustrated by Fig. 13;

Figs. 22 and 23 are plan views of parts of the apparatus shown in Fig. 13, illustrating steps in the method of this form of invention.

As illustrated in Fig. 8 the flexible band manufactured in accordance with the method and apparatus of the present invention is of a known type and comprises a plurality of links L arranged in end-to-end relation in each of a plurality of parallel rows and with the links of one row offset longitudinally from the links of adjacent rows. The links L are pivotally connected to each other and held in band forming relation by pivot pins P which extend through the links transversely of the band, the opposite ends of the pivot pins being upset or spun over as indicated at R to prevent movement of the links off the pivot pins. It will be understood that the ends of the pivot pins are thus enlarged after they are projected through the links.

Briefly described, the method of the present invention comprises disposing the links in parallel grooves of a support whereby to arrange the links in end-to-end relation in each of a plurality of parallel rows with the links in one row offset longitudinally of the links in an adjacent row so that the links in the several rows occupy the same relative positions as in the finished band; and then projecting a plurality of the pivot pins simultaneously through the companion links of the several rows in link holding and pivoted relation in which the pivot pins extend transversely of the rows of links. More particularly, in accordance with the method of the present invention, the links are positioned in a plurality of longitudinal grooves for arranging the links in the rows and the pivot pins are positioned in a plurality of transverse grooves for guiding the movement of the pivot pins through the links. The method of the present invention will now be described in detail in conjunction with the description of the apparatus of this invention.

Referring now to the drawings in detail, the apparatus embodying the present invention, in the forms shown in Figs. 1 to 12, comprises an inclined support including a plate 10, provided in its upper surface with a track or guideway which, in these forms of the invention, comprises a plurality of longitudinal grooves 12 in each of which the links are arranged in end-to-end relation as illustrated in Figs. 4, 6 and 7. The lower ends of grooves 12 are provided with stop members 14 and 16 in alternating grooves, respectively, the upper ends of stop members 14 and 16 being longitudinally offset so that the links of the several rows in the grooves are longitudinally offset. Plate 10 is positioned in inclined relation on a base 18, the lower end 20 of said plate resting on and being fastened to the base in any suitable way as by one or more bolts 22, and the upper part of said plate being supported by a brace 24 fastened to said plate and base in any suitable way as by bolts 26 and 28.

The links are supplied to the grooves 12 of plate 10 from a container or hopper 30 which is slidably mounted on a plate 32. As shown in Fig. 2 the lower end of plate 32 overlaps the upper end of plate 10 and is positioned in a recessed portion 34 provided in said plate 10. Plate 32 is provided with a plurality of grooves 36 which converge downwardly from hopper 30 and register with the parallel grooves 12 of plate 10. Hopper 30 is vibrated for causing the links in the hopper to be discharged therefrom into the grooves 36 for movement of the links into the grooves 12 of plate 10. Plate 32 is slidably engaged on its lower surface by the bottom 37 of the hopper, and the upper surface of said plate is slidably engaged by the lower edges of inclined walls 39 of the hopper. It will be understood that the links can leave the hopper only when properly positioned in the grooves 36 of plate 10 so as to be in end-to-end relation longitudinally of grooves 36 of plate 32 and of grooves 12 of plate 10 and so that the open sides of the links lie adjacent the opposite sides, respectively, of the companion grooves 36 and 12. The means for vibrating the hopper 30 comprises an electric motor 38 supported in a frame bracket 40, one at each side of the motor, secured to base 18 and to said motor. Said motor is connected through speed-reduction gearing, indicated at 42, to the hopper by means of a link 44 pivotally connected at one end thereof to a pin 46, fixed to the bottom of the hopper, and pivotally connected at its other end by means of a pin 48 to the rotary member 50 operated by the rotary driving shaft 52 of the speed-reduction mechanism.

A cover plate 54 overlies the adjacent portions of plates 10 and 32 for holding the links in the grooves as they move downwardly on said plates in said grooves. The upper end of cover plate 54 is spaced from the adjacent end of hopper 30 to allow movement of the hopper along plate 32. Cover plate 54 is fastened to plates 10 and 32 in any suitable way as by screws 56. A transparent cover plate 58 which may be formed of "Lucite" or any other suitable material extends from the lower end of cover plate 54 to the lower end of plate 10 and is positioned removably between the side members 60 and 61 which are fastened to plate 10. As clearly illustrated in Fig. 3 cover plate 58 has inclined side edges 62 which conform to correspondingly inclined edges of said members 60 and 61, respectively. Pivoted latch members 64 are provided on side member 61 for releasably holding cover plate 58 in position. An end plate 66 is fastened to the lower end of plate 10 for preventing downward movement of cover plate 58. Pins 68 are provided on cover plate 58 to facilitate the insertion and removal of the latter into and from its position between side members 60 and 61.

Plate 10 is provided with a plurality of transverse grooves 70 in the portion of the upper surface of said plate on which the pivot pins are assembled with the links L and it will be noted that the bottoms of the transverse grooves are above the bottoms of the longitudinal grooves 12 so that the side openings of the links register with the pivot pins which are placed in the grooves 70 for projection through the companion laterally disposed links in grooves 12. In this connection it will be understood that pivot pins P are placed in the grooves 70 in position laterally of the adjacent longitudinal groove 12 when cover plate 58 is removed. Provision is made for perfecting the lateral alignment of links L before the operation of projecting the pivot pins P through the links is performed. The link-aligning operation is performed by projecting a plurality of aligning pins 72 through the links L positioned in rows in the grooves 12. The aligning pins are fixed to a strap 74 carried by a bar 75 of frame 77. Said frame 77 is mounted for sliding movement longitudinally of guide rods 76 fixed in plate 10 in any suitable way as by screws 80 (Fig. 3). A cam 82 is provided for moving bar 75 to its projected position in which the aligning pins 74 extend through the links L for accomplishing the lateral alignment of the links in the grooves 12. Cam 82 is turnable on a shaft 84 carried by frame 78. An arm 88 is fixed to cam 82 for turning the latter to operate the cam. Said arm is provided with a handle 89. Fig. 4 shows the position of the parts in which the aligning pins 72 are projected through the links, and Fig. 1 shows the aligning pins in their retracted position.

After the pins are brought into perfect lateral alignment by the projection of the aligning pins 72 therethrough, the pivot pins P are projected through the links simultaneously by the means which will now be described. Said means comprises a plurality of projecting pins 90 fixed to a strap 92 carried by a bar 94 of frame 95 slidably mounted on guide rods 76. Projecting pins 90 are movable in companion grooves 70 respectively, for engaging the adjacent ends of the pivot pins P in said grooves for moving them through the links. A cam 96 is provided for moving bar 94 longitudinally of guide rods 76 to project the pins 90 for moving the pivot pins through the links. Cam 96 is turnable on a shaft 98 fixed in a bearing carried by frame 78. An arm 100 provided with a handle 101 is fixed to cam 96 for operating the cam.

Figure 9:
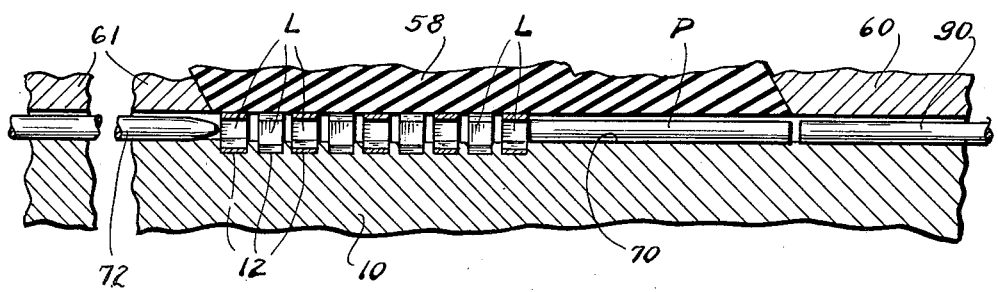
Figs. 9 to 11 are views illustrating more or less diagrammatically the method of assembling the pivot pins with the links.
Figure 10:
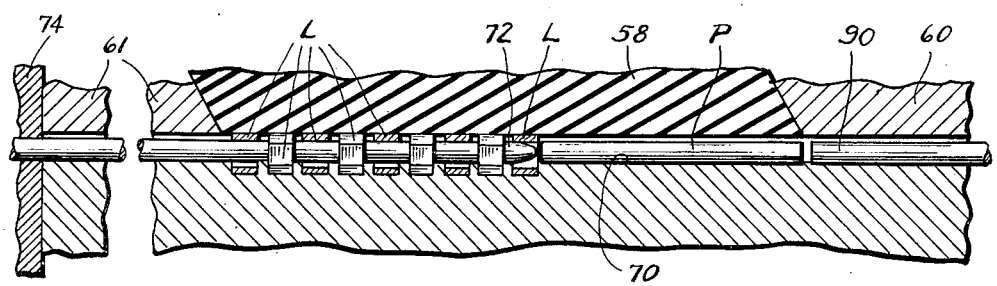
Figure 11:
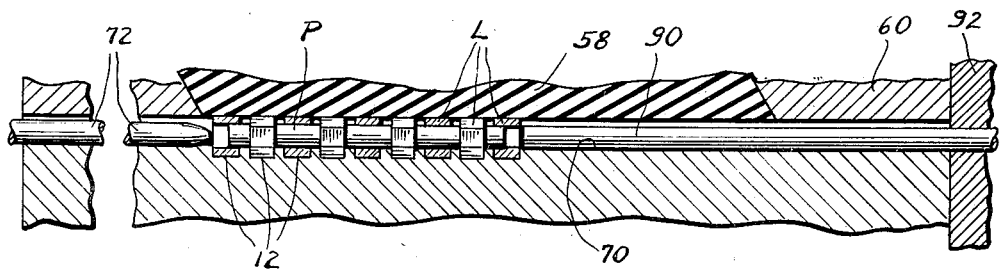

The operations of aligning pins 72 and projecting pins 90 are illustrated in Figs. 9, 10 and 11. Thus, for aligning the links L laterally of each other to condition them for the projection of the pivot pins P laterally through the companion laterally aligned links, the aligning pins 72 are moved in the lateral grooves 70 from the position illustrated in Fig. 9 to the position illustrated in Fig. 10 by operation of the cam 82 on pin carrying bar 75 to turn said cam from the position illustrated in Fig. 1 to the position illustrated in Fig. 4. Then, in order to project the pivot pins P through the links L, the projecting bar 94 is moved by cam 96 from the position illustrated in Fig. 1 to the position illustrated in Fig. 11. It will be noted that the aligning pins 72 are progressively moved out of the links L. A stop pin 103 is carried by bar 75 and is slidable through plate 10 for engagement with bar 94, in the retracted position of frame 95, to limit the projecting movement of bar 75 and thereby to limit the projecting travel of pins 72 so that the free ends thereof are in the remote end row of links L in the fully projected positions of said pins as illustrated in Fig. 10. When cam 96 is operated to project pins 90, bar 94 presses on stop pin 103 for moving bar 75 toward its retracted position so that aligning pins 72 are progressively withdrawn from links L while the pivot pins are being projected therethrough.

From the above description, it will be understood that in performing the method of the present invention by the apparatus hereinbefore described, the links L are arranged in end-to-end relation in the grooves 12 automatically by movement of the links from the hopper 30, downwardly on plates 32 and 10, the end members 14 and 16 in the alternating grooves 12 serving to effect the offset relation of the links in the alternating rows thereof. The movement of the links from the hopper is accomplished by the operation of the motor 38 which vibrates the hopper on plate 32 for causing the links to move out of the hopper with proper positioning of the links in the grooves, that is with the opposite open sides of the links adjacent the opposite sides, respectively, of the companion grooves. As soon as a sufficient number of links are thus arranged in the grooves 12 for assembly with the pivot pins P, the operation of the motor is terminated. Then the links are brought into perfect lateral alignment by the projection of the aligning pins 72, and then the pivot pins P are projected through the links as described above. Then cover plate 58 is removed and the assembly of the links and pivot pins, in band forming relation, is manually removed from plate 10 through the open top thereof, and subsequently the opposite ends of the pivot pins are upset as previously described with reference to Fig. 8 of the drawings for holding the links against movement laterally of the pivot pins.

In accordance with the modification illustrated in Fig. 12, provision is made for operating the aligning pins 72 and the projecting pins 90 under control of a single cam 102 instead of the two cams 82 and 96. For this purpose, the bar 75 which carries the aligning pins is in fixed relation to the bar 94 which carries the projecting pins, said two bars being connected to each other by the shouldered rods 104 which are slidable through companion bores 106 provided in plate 10 below the grooved surface of said plate. A frame member 108 is fixed to bar 94 and is positioned to be engaged by cam 102 for moving bar 94 to the right viewing Fig. 12 and thereby moving bar 75 to the right for projecting the aligning pins 72 through the links in the grooves 12 of plate 10. On the other hand, when cam 102 is turned so as to engage bar 94 said bar is moved to the left for moving the projecting pins 90 into engagement with the pivot pins P for moving the latter through the links and for simultaneously moving the aligning pins 72 out of the links. Cam 102 is turnable on a shaft 110 carried by a bracket 112 fixed to plate 10. An arm 114 is fixed to cam 102 for turning the latter for operating the cam in either direction.

It will be noted that the plate 10 shown in Fig. 12 is provided with only three longitudinal grooves 12 while the plate 10 in the apparatus illustrated in Fig. 1 is provided with a larger number of grooves. As a man's bracelet or wrist watch band is ordinarily wider than a woman's bracelet or wrist watch band, the apparatus illustrated in Fig. 1 is intended for use in the manufacture of flexible bands for men's wear while the apparatus illustrated in Fig. 12 is intended for use in the manufacture of flexible bands for women's wear, although it will be understood that the apparatus shown in Fig. 12 can be provided with additional grooves 12 for making a wider band for men or for women and the apparatus illustrated in Fig. 1 can be provided with a larger or smaller number of grooves 12 for making wider or narrower bands for men or for women.

In accordance with another form of the method of the present invention which will now be described with reference to Figs. 13 to 23 inclusive, the parallel grooves 12 in which links are arranged in the above described forms of the invention are omitted and instead, there is provided a single guide groove or track 200 in the downwardly inclined plate 10B which corresponds to the plate 10 of Fig. 1. Said groove 200 extends longitudinally of plate 10 from the lower or outlet ends 36a (Fig. 16) of the converging grooves 36 to the lower end of plate 10B. The links L, which are supplied from the reciprocating hopper 30B and which move downwardly therefrom in the converging grooves 36, are arranged in offset relation at the start of the operation of the apparatus by the use of an auxiliary device 202 which has a sliding fit in groove 200. The cover plate 204 is removed from plate 10B to permit the insertion of device 202 in the upper part of groove 200. As illustrated in Fig. 21, the auxiliary device 202 comprises a bar of rectangular cross-section and provided at one end thereof with a plurality of laterally spaced grooves 206 with complementary laterally spaced projections 208.

Thus, as illustrated in Fig. 22, when device 202 is positioned in the upper part of groove 200 with the grooved end of said device adjacent the lower ends 36a of converging grooves 36, the links L at the lower ends of said grooves 36 are arranged in longitudinally offset relation in the grooves and adjacent the projections 206 and 208, respectively. It will be understood that the hopper 30B is in operation while the links L are thus being aligned in longitudinal offset relation by device 202 so that links continue to move downwardly in the grooves 36.

Having aligned the links L in offset relation at the upper end of groove 200, as illustrated in Fig. 22, device 202 is moved downwardly in groove 200 to the region of plate 10B at which two link-retaining pins 210 carried by and movable with the bar 94B are located. More specifically, as illustrated in Fig. 23, device 202 is moved downwardly to a position in which the overlapping ends of the three lowermost transverse rows of links L are in alignment with pins 210. The cam 96B for operating the pin carrying bar 94B is then actuated for moving the pins 210 through the lowermost transverse rows of links L, that is, from the position of said pins illustrated in Fig. 22 to the position illustrated in Figs. 13 and 23. Then the device 202 is removed and need not be used thereafter while the operations of the apparatus are continued for forming successive lengths of the link and pivot pin assemblies.

The links L are maintained in their longitudinal offset relation while moving downwardly in the part of groove 200 below the points at which pins 210 are located by means of a slide plate 212 which has a sliding fit in groove 200. The upper end of said plate is provided with laterally spaced grooves and projections like the grooves 206 and 208 of auxiliary device 202. Plate 212 is carried by a transparent cover 214 which is provided with a longitudinal slot 216. A pin 218 is fixed to plate 212 and projects through slot 216, said pin having a sliding fit in said slot. The upper or outer end of said pin is provided with a finger piece or knob 220 and a flat spring 221 is disposed between said knob and cover 214 for holding slide plate 212 resiliently against the inner surface of cover 214. Said cover is preferably hinged at its upper end to plate 10B in any suitable way as by the hinges 222. The opposite longitudinally extending side edges of cover 214 are straight so that said cover can be opened and closed by pivotal movement thereof on said hinges 222.

Slide plate 212 is operated in the following way for maintaining the links L in their longitudinal offset relation while said links move downwardly in groove 200 at which time the pins 210 are in their retracted positions illustrated in Figs. 16 and 23. Before pins 210 are moved to their retracted positions, slide plate 212 is moved upwardly in groove 200 of said slide plate into the position in which the two lowermost transverse rows of links L engage said slide plate at the adjacent end thereof in the grooves and at the projections of said end. Then while the slide plate is thus held in this position and serves to maintain the links L in their longitudinal offset relation, cam 96B is operated to retract pins 210 and immediately thereafter slide plate 212 is moved downwardly in groove 200 while said plate is maintained in engagement with the lowermost longitudinally offset links. Thus, as plate 212 is moved downwardly the links follow the plate and are maintained in their longitudinally offset relation in groove 200 and also in grooves 36. The downward movement of slide plate 212 is limited by the lower end of slot 216 or a stop pin 224 may be provided as shown to limit the downward movement of said slide plate. Then the bar 74B, which corresponds to bar 74 of the apparatus illustrated in Fig. 1, is operated by the cam 82B to project the aligning pins 72 carried by said bar laterally through the links L in the same manner as hereinbefore described in reference to the other forms of the present invention. Then the cam 96B is operated to move pin carrying bar 94B to its projected position for projecting the pivot pins P, by means of the projecting pins 90, through the links which have thus been aligned by the aligning pins 72. The rod 103 described above is slidable transversely of plate 10B in a guide opening therein to maintain bars 74B and 94B in predetermined minimum spaced relation so that bar 74B must be operated to retract the aligning pins 72 from the links L in order to permit the pivot pins to be projected through the companion links. Preferably cams 82B and 96B are operated in such manner as to progressively retract the aligning pins 72 while the pivot pins P are being projected into the companion links respectively. Thus, the aligning pins 72 cannot engage the pivot pins P.

It will be noted that when bar 94B is operated by cam 96B to project the projecting pins 90 into engagement with the pivot pins P for projecting the latter through the companion links L, the abovementioned two pins 210 are simultaneously projected through the companion links which are in alignment with said two pins respectively. At this stage of operation of the apparatus and of the performance of the method of the present invention, the cover 214 is opened, thus removing the slide plate 212 from groove 200 so that the longitudinally extending link and pin assembly can be removed from the apparatus. Then the cover is again closed and the slide plate 212 is moved to its upper position to maintain the links in the upper part of groove 200 in their longitudinally offset relation while said links are allowed to move downwardly in said groove under the control of plate 212, pins 210 having been moved to their retracted position as described above. It will be noted that in accordance with this form of the method of the present invention, the links L are not spaced longitudinally of the pivot pins P but are disposed in close side-by-side relation in groove 200, thus making it unnecessary to move the links together with their companion pivot pins following the removal of the link and pin assembly from the apparatus.

The cam-operating arms 88B and 100B and the frames 77B and 95B, which correspond to the frames 77 and 95, respectively, of the apparatus illustrated in Fig. 1, are provided with means for releasably holding said frames in predetermined positions on the rods 76 on which said frames are slidable. Each of the cam-operating arms is provided with a pin 226 movable in an opening in said arm and engaged by a spring 230 for releasably holding said pin in a recess 232 provided in the companion plates 234 fixed to the frames 77B and 95B, respectively. In the releasably retained positions of frames 77B and 95B, the link-retaining pins 210 are in their link-retaining positions and bars 74B and 94B are held releasably against movement which would result in projecting the aligning pins 72 and the projecting pins 90 into the groove 200 in the path of plate 212, while the link-retaining pins 210 are releasably held against movement which would retract said pins from engagement with the lowermost links in the upper part of track 200. It will be understood, however, that when sufficient pressure is exerted on arms 88B and 100B for turning cams 82B and 96B, respectively, spring-pressed holding pins 226 ride out of their companion recess 232 to permit operation of said arms to actuate said cams.

In accordance with the present invention, the link-supply hopper is also preferably provided with means for causing the links to be positioned in the converging grooves 36 and to move downwardly in said grooves out of the hopper. Any suitable means may be provided for this purpose but said means is preferably of the construction provided in accordance with the present invention as will now be described. Thus, referring to Figs. 13 and 18 to 20, the hopper 30B, which is reciprocated on the plate 32 in the same way as described above with reference to the hopper 30 of apparatus illustrated in Fig. 1, is provided with a plurality of brushes 240, the heads 242 of which are fixed to companion bars 244 and 246, respectively. Bars 244 and 246 are mounted for reciprocation in the opposite side walls 248 of the hopper and are connected together for conjoint movement by the coupling member 250. A bell crank lever 252 is pivotally mounted by means of a pivot pin 254 to bracket 256 which is rigidly secured to one of the side walls 248 of the hopper, One arm 258 of said bell crank lever is pivotally connected to brush-carrying bar 244 and the other arm 260 of said bell crank lever is positioned to be engaged alternately by the spaced fingers 262 of plate 264 which is fastened to grooved plate 32 at one side edge thereof. It is apparent that when hopper 30B is reciprocated on plate 32, brush-carrying bars 244 and 246 are reciprocated transversely of grooves 36 by bell crank lever 252 since the latter is oscillated by its engagement alternately with spaced fingers 262 during the reciprocation of the hopper. Also it will be observed that since hopper 30B is reciprocated longitudinally of grooves 36 and plate 32, brushes 240 are effective to cause the links L to move out of the hopper in said grooves, thus adding to the action of gravity on said links due to the downwardly inclined position of grooved plate 32. It will be understood that the hopper 30 of the apparatus illustrated in Fig. 1 may be provided with the brushing device with which the hopper 30B is provided as just described. The bristles of brushes 240 are preferably of varying length as illustrated more or less diagrammatically in Fig. 19, to prevent the links from adhering to the brushes. Also the rear wall of the hopper is provided with wiper 268 formed of flexible material such as leather for engaging the upper surface of plate 32 to prevent links from passing out of the hopper at the back thereof. Said wiper 268 may have projecting edge portions which have a sliding fit in the grooves 36 of plate 32.

In the apparatus of the present invention and more particularly in the apparatus illustrated in Fig. 13, the plate 10B is provided, as clearly shown in Fig. 17, with a recess 270 in which a rack 272 is removably positioned. A dowel pin 274 is provided at the lower end of plate 10B for holding rack 272 in position. Said rack 272 is provided with a grooved upper surface 276 to position the pivot pins in correct lateral relation with the links L. It will be understood that the removable rack 272 is desirable as it provides means for furnishing sets of pivot pins without delaying the operation of the apparatus, since a plurality of racks 272 can be provided and the pivot pins P can be mounted or racked on the racks 272 when the latter are removed from the apparatus in readiness for insertion of the pin-carrying rack in position in recess 270 for each operation of the apparatus for assembling a set of pivot pins with a companion set of links.

It will be understood that various changes in the details of construction and in the arrangement of parts of the apparatus and various changes in the steps of the method of the present invention may be made without departing from the underlying idea or principles of the invention within the scope of the appended claims.

Having thus described my invention, what I claim and desire to secure by Letters Patent is:

1. Apparatus for making flexible bands of the type in which a plurality of links are disposed in end-to-end relation in each of a plurality of laterally disposed rows with the links in adjacent rows offset from each other longitudinally of the band and with pivot pins passing through companion links and extending transversely of the band, said apparatus comprising an inclined support provided with a plurality of grooves for positioning the links in end-to-end relation in parallel rows, respectively, the lower ends of said grooves being provided with end stop members offset from each other longitudinally of the grooves for positioning the links in one groove in offset relation to the links in an adjacent groove, a link container movably positioned at the upper ends of said grooves and provided with outlet openings which register with said upper ends of the grooves and through which the links are deposited in end-to-end relation in said grooves, respectively, for movement by gravity in said grooves, means for moving said container longitudinally of said support for effecting the discharge of links therefrom into said grooves through said outlet openings and means at the lower part of said support for projecting a plurality of pivot pins through the companion links of said rows.

2. Apparatus for making flexible bands of the type in which a plurality of links are disposed in end-to-end relation in each of a plurality of laterally disposed rows with the links in adjacent rows offset from each other longitudinally of the band and with pivot pins passing through companion links and extending transversely of the band, said apparatus comprising a support provided with a plurality of parallel grooves for positioning the links in end-to-end relation in parallel rows, respectively, said grooves being provided with end stop members offset from each other longitudinally of the grooves for positioning the links in one groove in offset relation to the links in an adjacent groove, means for depositing a plurality of links in end-to-end relation in each of said grooves, said support being provided with a plurality of parallel grooves disposed transversely of said first mentioned grooves for guiding pivot pins for movement through the companion laterally disposed links in said first mentioned grooves, and means including a plurality of pins movable in said transverse grooves and engageable with the pivot pins for moving the latter through the companion links, a bar carrying said projecting pins and mounted for movement to project and retract said projecting pins, and a cam engageable with said bar for moving the same.

3. Apparatus for making flexible bands of the type in which a plurality of links are disposed in end-to-end relation in each of a plurality of laterally disposed rows with the links in adjacent rows offset from each other longitudinally of the band and with pivot pins passing through companion links and extending transversely of the band, said apparatus comprising a support provided with a plurality of parallel grooves for positioning the links in end-to-end relation in parallel rows, respectively, said grooves being provided with end stop members offset from each other longitudinally of the grooves for positioning the links in an adjacent groove, means for depositing a plurality of links in end-to-end relation in each of said grooves, said support being provided with a plurality of parallel grooves disposed transversely of said first mentioned grooves for guiding pivot pins for movement through the companion laterally disposed links in said first mentioned grooves, and a plurality of link-aligning pins movable in said transverse grooves and through companion laterally disposed links in said first mentioned grooves for aligning said companion links in said first mentioned grooves, and means including a plurality of pins movable in said transverse grooves and engageable with the pivot pins for moving the latter through the companion links, a bar carrying said link-aligning pins mounted for movement to project and retract said aligning pins, a bar carrying said projecting pins and mounted for movement to project and retract said projecting pins, means connecting said bars for conjoint movement, and means operable to move said bars conjointly.

4. Apparatus for making flexible bands of the type in which a plurality of links are disposed in end-to-end relation in each of a plurality of laterally disposed rows with the links in adjacent rows offset from each other longitudinally of the band and with pivot pins passing through companion links and extending transversely of the band, said apparatus comprising a link-supply container, and a downwardly inclined support on which said container is mounted for reciprocation longitudinally of said support, the upper part of said support being provided with a plurality of grooves extending longitudinally in the upper surface of said support in downwardly converging relation from said container, said support having a track in its upper surface extending longitudinally of the support from the lower ends of said converging grooves and in which the links are slidable by gravity with the links arranged in a plurality of parallel rows and with the links in adjacent rows in abutting side-by-side relation, means slidable in said track for guiding said rows of links in their downward movement with the links of adjacent rows offset longitudinally of each other, and means for projecting a plurality of pivot pins through the companion longitudinally offset links while said links are arranged in said plurality of rows in said track.

5. Apparatus for making flexible bands of the type in which a plurality of links are disposed in end-to-end relation in each of a plurality of laterally disposed rows with the links in adjacent rows offset from each other longitudinally of the band and with pivot pins passing through companion links and extending transversely of the band, said apparatus comprising an inclined support having in its upper surface a longitudinally extending track having laterally spaced side walls and a bottom extending continuously between said side walls forming with the latter a single groove, means for arranging a plurality of links in end-to-end relation in parallel rows in said groove with the links in each row positioned in adjacent end-to-end relation and with the links of each row offset longitudinally from the links in an adjacent row, and means for projecting a plurality of pins laterally through the companion links in said groove.

6. Apparatus for making flexible bands of the type in which a plurality of links are disposed in end-to-end relation in each of a plurality of laterally disposed rows with the links in adjacent rows offset from each other longitudinally of the band and with pivot pins passing through companion links and extending transversely of the band, said apparatus comprising an inclined support having in its upper surface a longitudinally extending track having laterally spaced side walls and a bottom extending continuously between said side walls forming with the latter a single groove, means for arranging a plurality of links in end-to-end relation in parallel rows in said groove with the links in each row positioned in adjacent end-to-end relation and with the links of each row offset longitudinally from the links in an adjacent row, means for projecting a plurality of pins laterally through the companion links in said groove, a link-supply container mounted for reciprocation in position above the upper end of said groove for supplying links thereto, and means for reciprocating said link-supply container whereby to discharge links therefrom for movement of said links to said groove.

7. Apparatus for making flexible bands of the type in which a plurality of links are disposed in end-to-end relation in each of a plurality of laterally disposed rows with the links in adjacent rows offset from each other longitudinally of the band and with pivot pins passing through companion links and extending transversely of the band, said apparatus comprising an inclined support having in its upper surface a longitudinally extending track having laterally spaced side walls and a bottom extending continuously between said side walls forming with the latter a single groove, means for arranging a plurality of links in end-to-end relation in parallel rows in said groove with the links in each row positioned in adjacent end-to-end relation and with the links of each row offset longitudinally from the links in an adjacent row, means for projecting a plurality of pins laterally through the companion links in said groove, and means comprising a plurality of longitudinal grooves extending downwardly from the outlet of said container to the upper end of said track.

8. Apparatus for making flexible bands of the type in which a plurality of links are disposed in end-to-end relation in each of a plurality of laterally disposed rows with the links in adjacent rows offset from each other longitudinally of the band and with pivot pins passing through companion links and extending transversely of the bands, said apparatus comprising an inclined support provided at its upper part with a guideway for positioning the links in end-to-end relation in parallel rows, respectively, the lower end of said guideway being provided with means having end stop members offset from each other longitudinally of said guideway for positioning the links in one row in offset relation to the links in an adjacent row, and a link supply container positioned at the upper end of said guideway and provided with outlet openings in alignment with said guideway and through which the links are deposited in end-to-end relation in said guideway for movement by gravity in said guideway.

9. Apparatus for making flexible bands of the type in which a plurality of links are disposed in end-to-end relation in each of a plurality of laterally disposed rows with the links in adjacent rows offset from each other longitudinally of the band and with pivot pins passing through companion links and extending transversely of the band, said apparatus comprising a support provided with an inclined guideway having an upper part provided with a plurality of grooves for positioning the links in end-to-end relation in a plurality of laterally disposed rows, respectively, the lower part of said guideway being provided with end stop members offset from each other longitudinally of the guideway for positioning the links in one row in offset relation to the links in an adjacent row, a link container positioned at the upper end of said support and provided with outlet openings through which the links are deposited in end-to-end relation in said grooves, respectively, for movement by gravity in said grooves, and means at the lower part of said guideway for projecting a plurality of pivot pins through the companion links in said rows.

10. Apparatus for making flexible bands of the type in which a plurality of links are disposed in end-to-end relation in each of a plurality of laterally disposed rows with the links in adjacent rows offset from each other longitudinally of the band and with pivot pins passing through companion links and extending transversely of the band, said apparatus comprising an inclined support provided at its upper part with a guideway for positioning the links in end-to-end relation in parallel rows, respectively, the lower end of said guideway being provided with means having end stop members offset from each other longitudinally of said guideway for positioning the links in one row in offset relation to the links in an adjacent row, and a link supply container positioned at the upper end of said guideway and provided with outlet openings in alignment with said guideway and through which the links are deposited in end-to-end relation in said guideway, for movement by gravity in said guideway, and means at the lower part of said guideway for projecting a plurality of pivot pins through the companion links in said rows.

11. Apparatus for making flexible bands of the type in which a plurality of links are disposed in end-to-end relation in each of a plurality of laterally disposed rows with the links in adjacent rows offset from each other longitudinally of the band and with pivot pins passing through companion links and extending transversely of the band, said apparatus comprising an inclined support provided with a guideway having an upper part provided with a plurality of grooves for positioning the links in end-to-end relation in said grooves respectively, the lower end of said guideway being provided with end stop members offset from each other longitudinally of the guideway for positioning the links in one row in offset relation to the links in an adjacent row, and a link container positioned at the upper end of said guideway and provided with outlet openings in alignment with said grooves, respectively, and through which the links are deposited in end-to-end relation in said grooves, respectively, for movement by gravity in said grooves, means at the lower part of said guideway for aligning the links in each of said rows with the companion links, respectively, in the other rows, and means at the lower part of said guideway means for projecting a plurality of pivot pins through the companion links of said rows on said lower part of said guideway.

12. Apparatus for making flexible bands of the type in which a plurality of links are disposed in end-to-end relation in each of a plurality of laterally disposed rows with the links in adjacent rows offset from each other longitudinally of the band and with pivot pins passing through companion links and extending transversely of the band, said apparatus comprising a downwardly inclined support having a guideway for positioning the links in end-to-end relation in parallel rows, respectively, said guideway being provided with means having end stop members offset from each other longitudinally of the guideway for positioning the links in one row in offset relation to the links in an adjacent row, means at the upper part of said guideway for depositing a plurality of links in end-to-end relation in each of a plurality of rows in said guideway, said support being provided at the lower part thereof with a plurality of parallel grooves disposed transversely of said first guideway for guiding pivot pins for movement through the companion laterally disposed links in said lower part of the guideway, and means including a plurality of pins movable in said transverse grooves and engageable with the pivot pins for moving the latter through the companion links.

13. Apparatus for making flexible bands of the type in which a plurality of links are disposed in end-to-end relation in each of a plurality of laterally disposed rows with the links in adjacent rows offset from each other longitudinally of the band and with pivot pins passing through companion links and extending transversely of the band, said apparatus comprising a downwardly inclined support having a guideway for positioning the links in end-to-end relation in parallel rows, respectively, said guideway being provided with means having end stop members offset from each other longitudinally of the guideway for positioning the links in one row in offset relation to the links in an adjacent row, means at the upper part of said guideway for depositing a plurality of links in end-to-end relation in each of a plurality of rows in said guideway, said support being provided at the lower part thereof with a plurality of parallel grooves disposed transversely of said first guideway for guiding pivot pins for movement through the companion laterally disposed links in said lower part of the guideway, means including a plurality of pins movable in said transverse grooves and engageable with the pivot pins for moving the latter through the companion links, a movable cover for said lower part of the guideway, and means accessible externally of said cover for moving said end stop means longitudinally of said guideway.

14. Apparatus for making flexible bands of the type in which a plurality of links are disposed in end-to-end relation in each of a plurality of laterally disposed rows with the links in adjacent rows offset from each other longitudinally of the band and with pivot pins passing through companion links and extending transversely of the band, said apparatus comprising a downwardly inclined support having a guideway for positioning the links in end-to-end relation in parallel rows, respectively, said guideway being provided with means having end stop members offset from each other longitudinally of the guideway for positioning the links in one row in offset relation to the links in an adjacent row, means at the upper part of said guideway for depositing a plurality of links in end-to-end relation in each of a plurality of rows in said guideway, said support being provided at the lower part thereof with a plurality of parallel grooves disposed transversely of said first guideway for guiding pivot pins for movement through the companion laterally disposed links in said lower part of the guideway, and means including a plurality of pins movable in said transverse grooves and engageable with the pivot pins for moving the latter through the companion links, said end stop means being stationary at the lower end of said guideway.

15. Apparatus for making flexible bands of the type in which a plurality of links are disposed in end-to-end relation in each of a plurality of laterally disposed rows with the links in adjacent rows offset from each other longitudinally of the band and with pivot pins passing through companion links and extending transversely of the band, said apparatus comprising a downwardly inclined support having a guideway for positioning the links in end-to-end relation in parallel rows, respectively, said guideway being provided with means having end stop members offset from each other longitudinally of the guideway for positioning the links in one row in offset relation to the links in an adjacent row, means at the upper part of said guideway for depositing a plurality of links in end-to-end relation in each of a plurality of rows in said guideway, said support being provided at the lower part thereof with a plurality of parallel grooves disposed transversely of said first guideway for guiding pivot pins for movement through the companion laterally disposed links in said lower part of the guideway, means including a plurality of pins movable in said transverse grooves and engageable with the pivot pins for moving the latter through the companion links, said end stop means being movable longitudinally of said guideway in said lower part thereof, and means accessible externally of said cover for moving said end stop means longitudinally of said guideway.

16. Apparatus for making flexible bands of the type in which a plurality of links are disposed in end-to-end relation in each of a plurality of laterally disposed rows with the links in adjacent rows offset from each other longitudinally of the band and with pivot pins passing through companion links and extending transversely of the band, said apparatus comprising a downwardly inclined support having a guideway for positioning the links in end-to-end relation in parallel rows, respectively, said guideway being provided with means having end stop members offset from each other longitudinally of the guideway for positioning the links in one row in offset relation to the links in an adjacent row, means at the upper part of said guideway for depositing a plurality of links in end-to-end relation in each of a plurality of rows in said guideway, said support being provided at the lower part thereof with a plurality of parallel grooves disposed transversely of said first guideway for guiding pivot pins for movement through the companion laterally disposed links in said lower part of the guideway, means including a plurality of pins movable in said transverse grooves and engageable with the pivot pins for moving the latter through the companion links, said end stop means being movable longitudinally of said guideway in said lower part thereof, means accessible externally of said cover for moving said end stop means longitudinally of said guideway, and pins movable transversely of said guideway above said lower part thereof for retaining the links adjacent the top of said part of the guideway in said offset relation when the assembly of links in the lower part of said guideway is removed therefrom.

GEORGE VOLLET.

REFERENCES CITED

The following references are of record in the file of this patent:

UNITED STATES PATENTS

| Number | Name | Date |
|---|---|---|
| 151,362 | Davis | May 26, 1874 |
| 274,955 | Matteson | Apr. 3, 1883 |
| 1,053,227 | Moritz | Feb. 18, 1913 |
| 1,256,897 | Hayward | Feb. 19, 1918 |
| 1,627,972 | Hewitt et al. | May 10, 1927 |